US009363356B2

(12) United States Patent  
Colletti

(10) Patent No.: US 9,363,356 B2  
(45) Date of Patent: Jun. 7, 2016

(54) SYSTEM AND METHODS TO ENABLE EFFICIENT AND INTERACTIVE MANAGEMENT OF COMMUNICATIONS

(71) Applicant: Qula, Inc., Pittsburgh, PA (US)

(72) Inventor: Jack Colletti, Pittsburgh, PA (US)

(73) Assignee: QULA, INC., Pittsburgh, PA (US)

( * ) Notice: Subject to any disclaimer, the term of this patent is extended or adjusted under 35 U.S.C. 154(b) by 21 days.

(21) Appl. No.: 14/204,332

(22) Filed: Mar. 11, 2014

(65) Prior Publication Data

US 2014/0273977 A1 Sep. 18, 2014

Related U.S. Application Data

(60) Provisional application No. 61/788,523, filed on Mar. 15, 2013.

(51) Int. Cl.
*H04L 12/58* (2006.01)
*H04M 1/725* (2006.01)
*H04W 4/08* (2009.01)

(52) U.S. Cl.
CPC ...... *H04M 1/72547* (2013.01); *H04M 1/72566* (2013.01); *H04M 2250/60* (2013.01)

(58) Field of Classification Search
CPC ....... H04W 4/12; H04L 51/04; H04L 51/066; H04L 51/18; H04L 51/22; H04L 51/24; H04L 51/046; H04M 1/72547
USPC ............................ 455/412.1, 412.2, 415, 466
See application file for complete search history.

(56) References Cited

U.S. PATENT DOCUMENTS

| | | | |
|---|---|---|---|
| 6,692,328 B1* | 2/2004 | Reinberg et al. | 446/142 |
| 6,882,641 B1 | 4/2005 | Gallick et al. | |
| 7,373,179 B2 | 5/2008 | Stine et al. | |
| 8,243,900 B2 | 8/2012 | Kumhyr | |
| 8,479,122 B2 | 7/2013 | Hotelling et al. | |
| 2002/0032641 A1* | 3/2002 | Mendiola | G06Q 30/0267 705/37 |
| 2003/0063732 A1* | 4/2003 | Mcknight | H04M 1/274575 379/210.01 |
| 2004/0243679 A1 | 12/2004 | Tyler | |
| 2005/0204006 A1* | 9/2005 | Purcell et al. | 709/206 |
| 2005/0275541 A1* | 12/2005 | Sengupta et al. | 340/573.1 |
| 2005/0278206 A1* | 12/2005 | Choper et al. | 705/8 |
| 2006/0148496 A1* | 7/2006 | Zhu et al. | 455/466 |
| 2007/0129112 A1* | 6/2007 | Tarn | H04M 1/72552 455/566 |
| 2007/0263659 A1* | 11/2007 | Wang | 370/468 |
| 2008/0008106 A1* | 1/2008 | Boberg et al. | 370/270 |
| 2009/0006528 A1* | 1/2009 | Batni et al. | 709/203 |
| 2011/0131085 A1* | 6/2011 | Wey | 705/14.16 |
| 2011/0201365 A1* | 8/2011 | Segura | 455/466 |
| 2011/0263223 A1* | 10/2011 | Lim et al. | 455/411 |
| 2012/0089910 A1 | 4/2012 | Cassidy | |
| 2012/0215854 A1* | 8/2012 | Keast | 709/206 |
| 2013/0151630 A1 | 6/2013 | Lawrence-Apfelbaum | |

* cited by examiner

*Primary Examiner* — Christopher M Brandt
*Assistant Examiner* — Ki Ha Nam
(74) *Attorney, Agent, or Firm* — Cesari and McKenna, LLP

(57) ABSTRACT

Disclosed is a system and methods to enable the interactive management of incoming and outgoing communications in an automated or manual fashion.

17 Claims, 15 Drawing Sheets

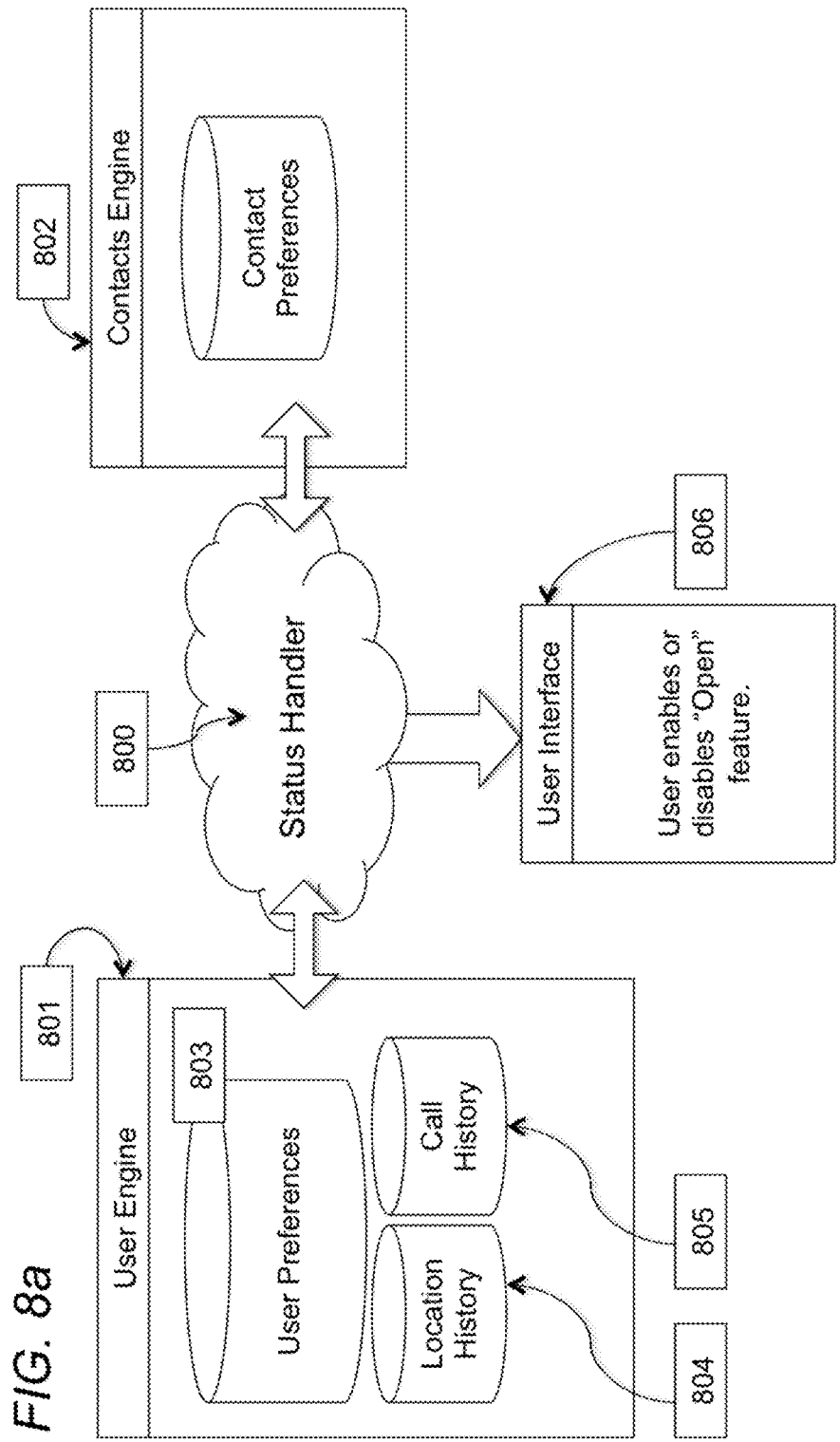

SYSTEM AND METHODS TO ENABLE EFFICIENT AND INTERACTIVE MANAGEMENT OF COMMUNICATIONS

CROSS-REFERENCE TO RELATED APPLICATIONS

The present application claims the benefit of U.S. Provisional Patent Application Ser. No. 61/788,523, which was filed on Mar. 15, 2013, by Jack Colletti for a SYSTEM AND METHODS TO ENABLE THE EFFICIENT AND INTERACTIVE MANAGEMENT OF COMMUNICATIONS, TO ENABLE COMMUNICATIONS-BASED RECOMMENDATIONS, AND TO REDUCE DISTRACTED DRIVING and is hereby incorporated by reference.

BACKGROUND

1. Technical Field

This disclosure relates generally to the field of communications. In some embodiments, it relates to a system and method for building of one or more interactive queues used in communications, such as phone calls, SMS text messages, electronic voice messages, and other communications and/or messaging systems.

2. Background Information

Despite the rise of social media technologies, the basic need to connect live (e.g. people talking to people) remains a critical element of business and other interactions. Surprisingly, no significant improvements have been made to the way that people actually talk live. For people that derive income from such communications, (e.g. sales managers, business executives, agents, consultants, real estate agents, etc), the need to connect with others live is critical. History has shown us that email and other social applications can be useful, but can not (and most likely will not) replace the basic process of one person communicating live with another individual.

Also, though "smart phones" are now pervasive and have many features (e.g. cameras, music, games) and applications, when it comes to placing, scheduling and managing calls, a user has very limited choices. Specifically, a user can make a call, receive a call, and listen to voicemails. Some smart phones now have "visual voicemail", which allows a user to see the time/date/caller details of a voicemail. However, when it comes to the personal telecom/calling process, users are essentially no better off then they were 25 years ago.

SUMMARY

An individual may experience a wide range of problems or inefficiencies associated with live communications. Some examples include: not properly following up on incoming calls; losing track of who to call back and when; forgetting to regularly touch base with top clients; double or triple booking conference calls as result of poor calendar management; poor management of sales prospecting calls; and taking personal calls during work hours.

Because these stated problems can be very expensive for individuals and businesses, I have determined that it would be useful to have a solution that enabled an individual the ability to more efficiently and cost effectively manage calls and other incoming/outgoing communications.

Specifically the system and methods include the following.

A system and/or method that allows a user to efficiently manage communications by using one or more interactive queues. In one implementation, the system and/or method includes a unique Graphical User Interface (GUI) for the easy management or scheduling of communications. The GUI can be manipulated via a wide variety of common internet enabled devices such the iPhone, Droid smart phone or interactive devices such as a tablet PC, interactive television, in-car telematics system, etc.

The following related methods are further discussed:

Method for assigning communications media to one or more queues.

Method for automating the handling of communications media.

Method for sequential or random dialing of contacts in a user-defined or system-defined queue.

Method for improving communications efficacy by enabling workflow and notifications between contacts.

Method for improving follow-ups with contacts.

Method for presenting commerce-based recommendations or other customized recommendations to a user based on that user's specific communications.

Method for signaling "open/available" status to contacts and subsequent handling of communication.

Method to reduce distracted driving via game-based or incentive systems.

BRIEF DESCRIPTION OF THE DRAWINGS

The invention description below refers to the accompanying drawings, of which:

FIGS. 8a, 8b, and 8c are a high-level system diagram, and two block diagrams that illustrate a typical workflow of the Open/Available status, respectively.

DETAILED DESCRIPTION OF AN ILLUSTRATIVE EMBODIMENT

Definitions.

"Workflow" is a commonly known term and is defined in the Business Dictionary (www.businessdictionary.com) as a progression of steps (tasks, events, interactions) that comprise a work process, involve two or more persons, and create or add value to the organization's activities. In a sequential workflow, each step is dependent on occurrence of the previous step; in a parallel workflow, two or more steps can occur concurrently.

"Communications" may include a plurality of electronic or telecom related items, including but not limited to phone calls, voicemails, Short Message Service (SMS) messages (a.k.a. text messages), electronic mail (email), et al.

System Architecture

Figure 1A:
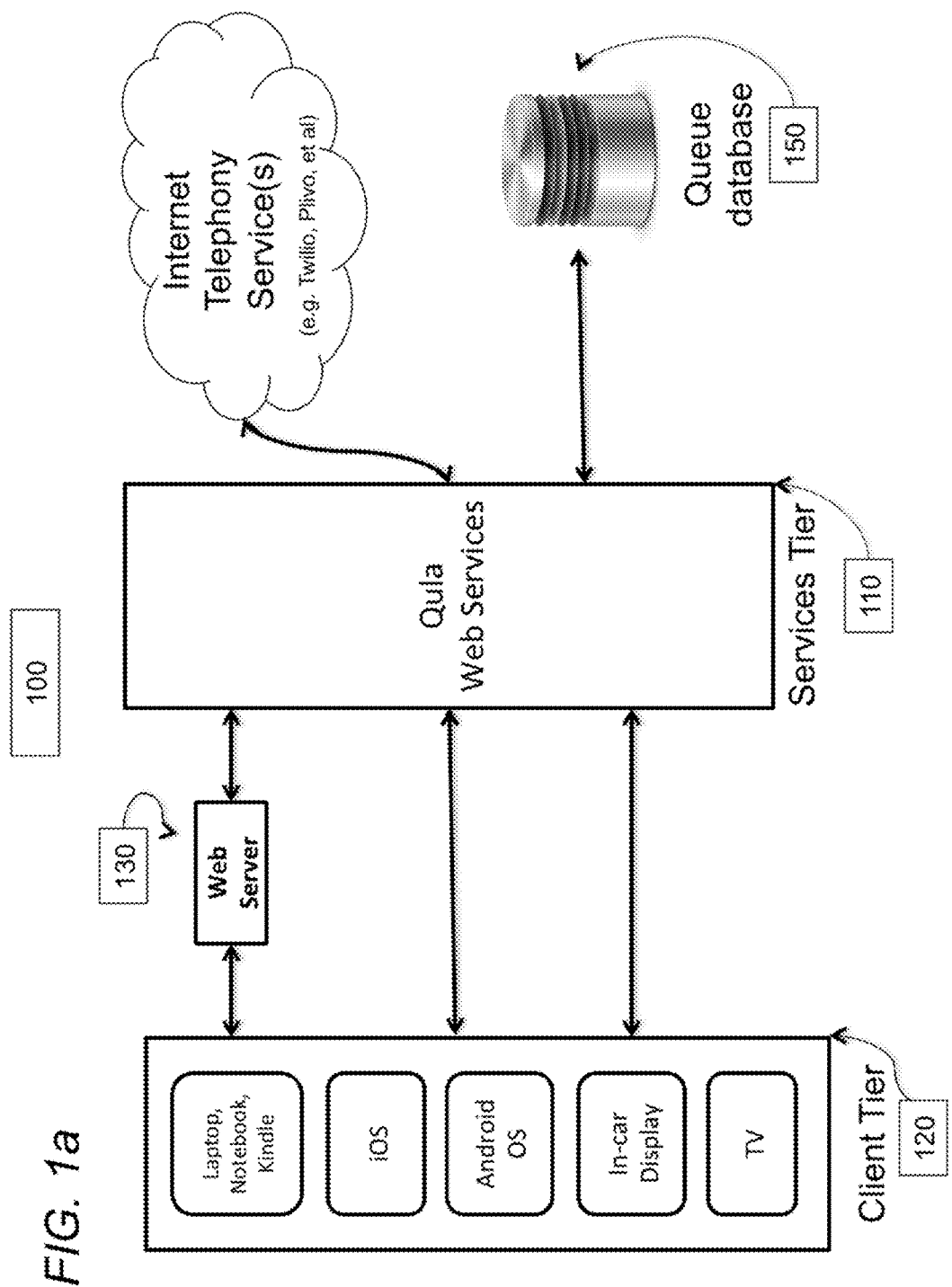
FIGS. 1a, 1b, and 1c are a high-level system architecture, GUI, and GUI with labels, respectively.

As depicted in FIG. 1a, the System [100] is primary comprised of a Services Tier [110] and a Client Tier [120]. The Services tier contains a series of computer programs that execute processes for the management of media, data, calls, or any combination thereof. In one embodiment, the Services tier interacts with an interactive telephony service for the processing of telephone calls and related data. It may also interact with other message services such as email, short message services, and the like (not shown in FIG. 1a). The Services Tier may also maintain certain information in a Queue Database [150].

The Client tier presents results to users via standard media devices such as smart phones, tablet PCs, in-car telematics systems, internet-enabled televisions, etc.

A standard internet/web server [130] may connect the Services and Client tier.

User Interface

The system [100] also provides computer-based program that handles communications and displays them to the user in a unique graphical user interface (GUI).

Figure 1B:
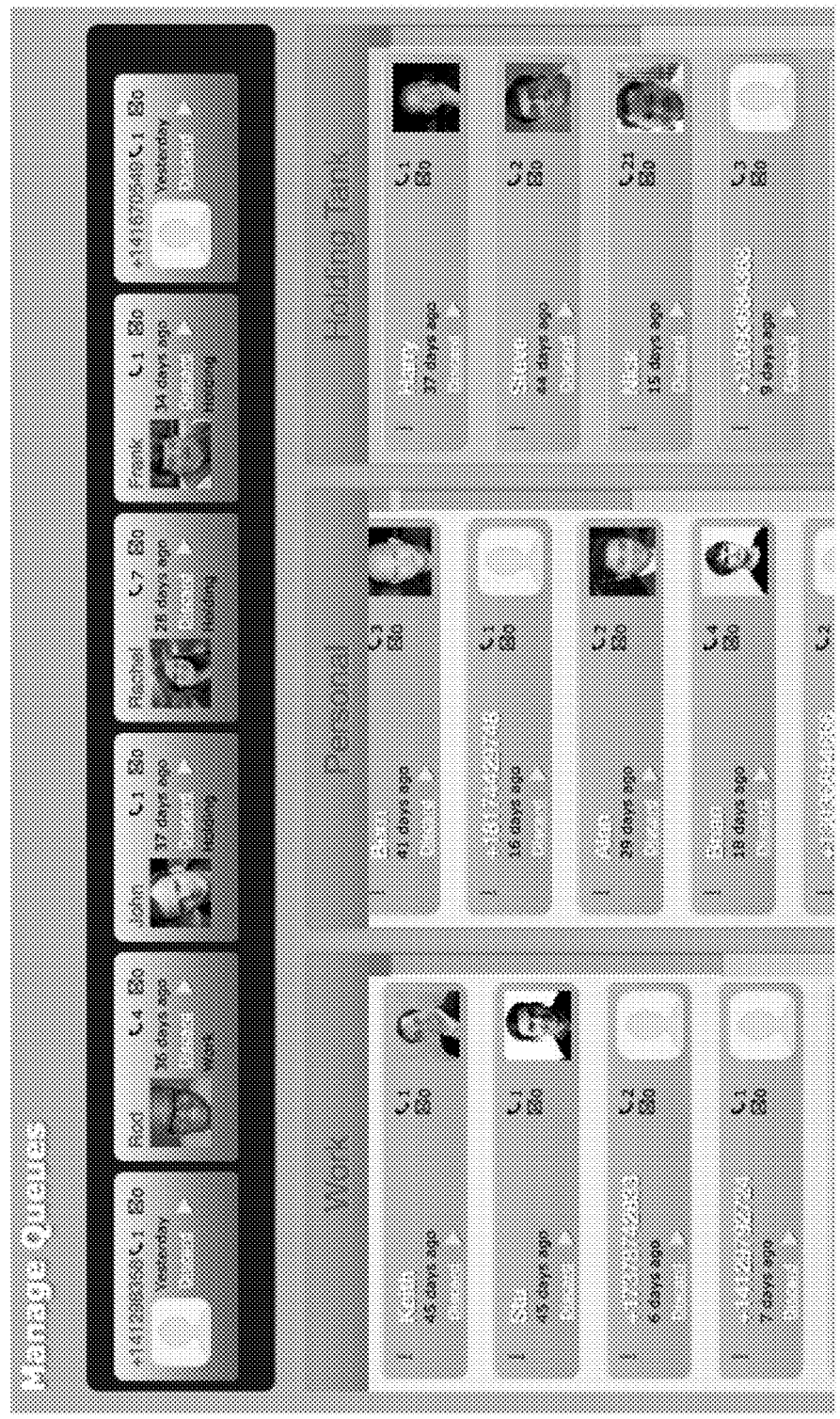
Figure 1C:
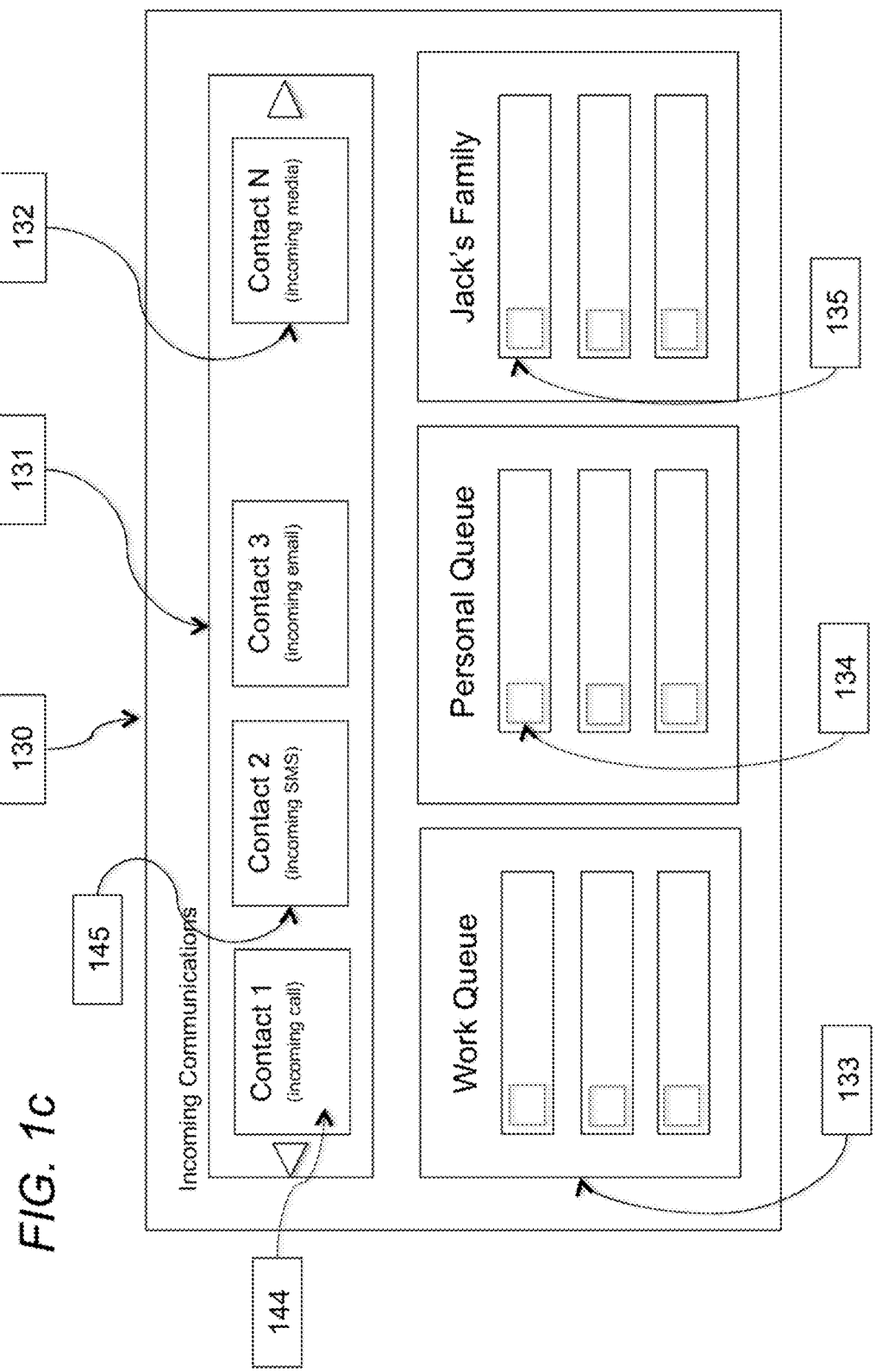

FIG. 1b is a screen capture of a representative GUI and is further explained in FIG. 1c.

FIG. 1c illustrates one embodiment of the GUI [130]. The system [100] may implement the GUI to enable the user to view and manipulate (via the internet, a mobile/smart phone, or other interactive device) in the client tier [120] an incoming stream [131] of communications media [132], including phone, SMS, email, or other messages. The system may identify a plurality of incoming and outgoing communications, each identified by certain information [134] relating to the sender/originator of a message including (but not limited to) the sender's phone number and/or certain additional profile information, which may be based on a user's existing photo and profile or integrated information obtained from widely available social media sites such as Facebook, LinkedIn, Twitter, et al. or contact management sites such as Plaxo et al. More specific methods related to this system follow.

Method for Assigning Communications Media to One or More Queues.

The intent of this method is to enable more efficient management of common interactive communications. For most users, there exists a high degree of waste and inefficiency associated with managing multiple streams of incoming communications media (e.g. telephone calls, SMS messages, emails, voicemails, et al).

In general terms, the method enables a user to manage these communications through the use of queues.

Representative Example: In one example shown in FIG. 1c, once a communication is received by the system [100], the system allows the user the ability to manually move a "call element" to a default or user-defined queue in queue database [150]. For example, the user named Jack may assign a call [144] from his brother to his "Jack's Family" queue [135]. In another example, the user may assign or move an incoming SMS message [145] from his co-worker to his "Work" queue [133]. The system gives the user the choice of leaving the elements in their initially assigned queues, or the user can take a number of other specific actions. For example, the system allows the user the ability to select a number of options, including (but not limited to) initiating a return call, sending a SMS to the caller, or sending an email.

Figure 2A:
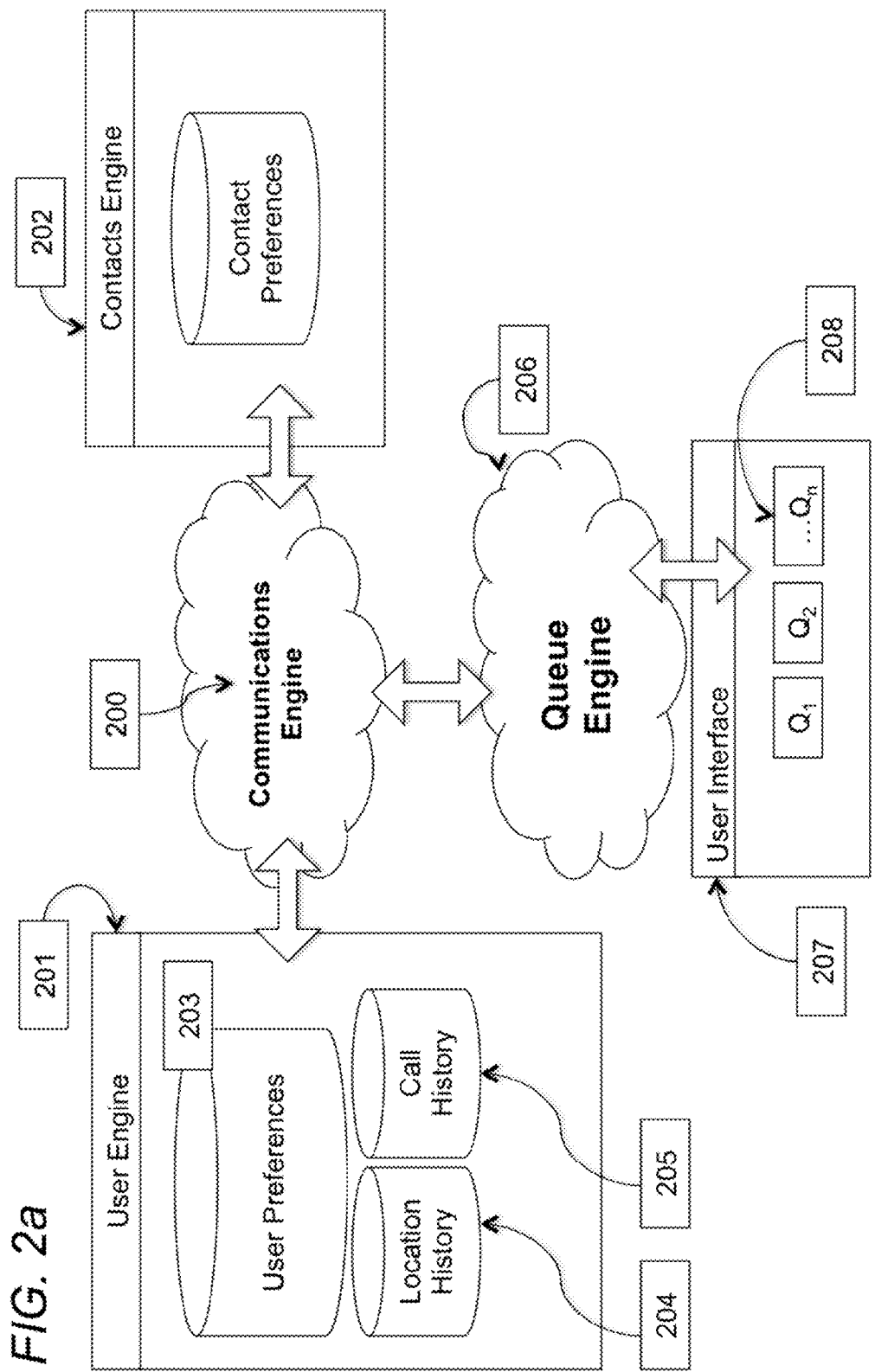
FIGS. 2a and 2b are a system diagram and an example of contact movement from one queue to another, respectively.

FIG. 2a illustrates the system overview, where this specific queue assignment method is accomplished via a Communications engine [200] that processes both User preferences [201] and Contact data [202]. Specifically, as communications media are received by the system [100], an internal process creates a visual Element ("element") that has specific data properties and attributes. Further, this visual element can be moved by the User to one or more queues. When this action is taken, a series of computer processes/events take place in the Queue Engine [206]. For example, this engine records and processes the state, status, and attributes of all contacts. The engine also enables the presentation [207] of elements in one or more queues [208].

Figure 2B:
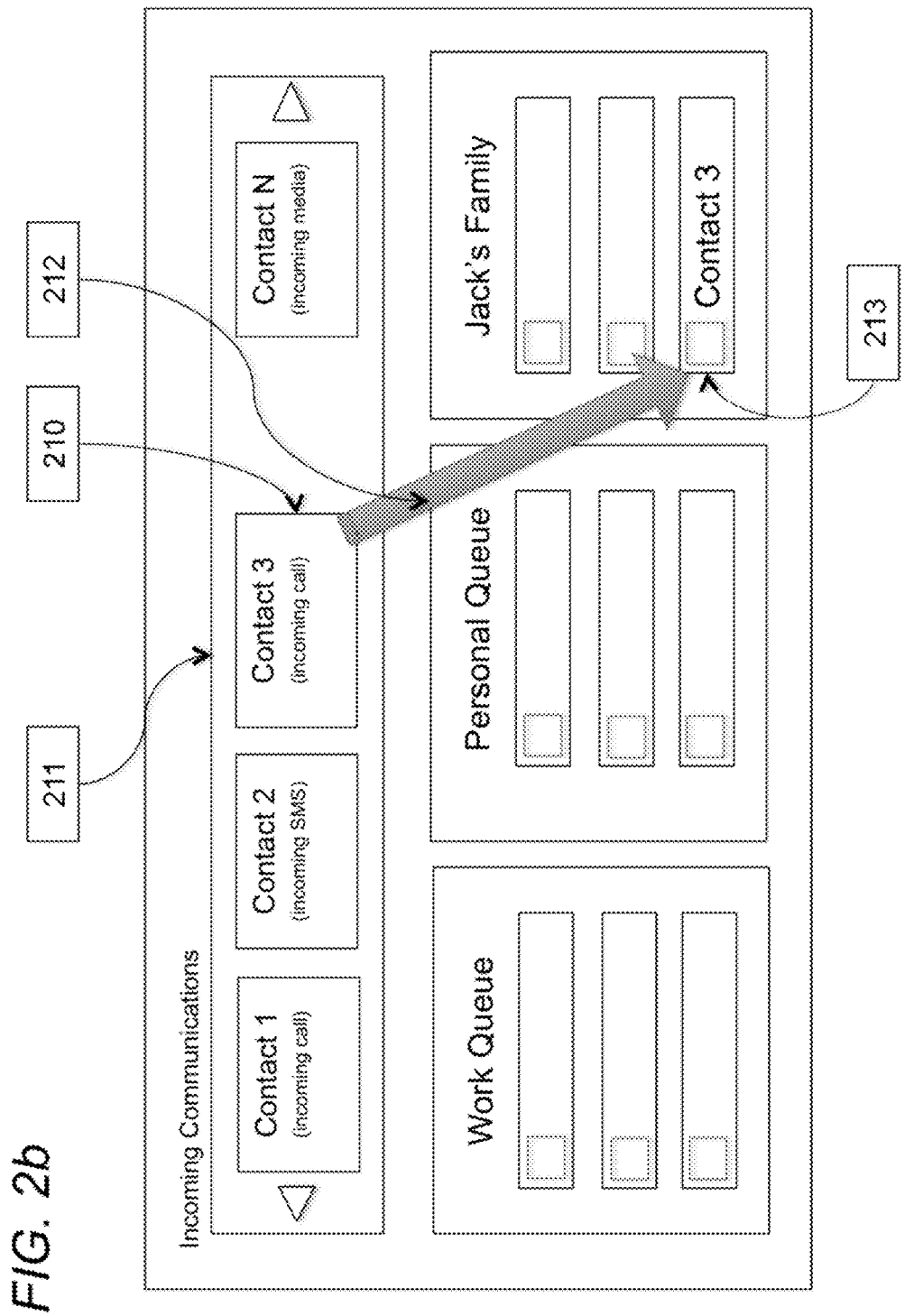

FIG. 2b illustrates how an incoming media element [210] which is present in the incoming stream [211] can be displayed using the GUI on a touch-sensitive client tier [120] device and moved [212] via a commonly known touch gesture such as a swipe/drag (or similar) method (using fingers, stylus, a computer mouse, et al.) to its intended position [213]. In another embodiment, communications media may be automatically assigned to Queues based on system or user defined preferences.

Method for Automating the Handling of Communications Media.

The system fosters the automatic assignment of incoming communications (calls, emails, SMS, or other), based on user preferences and contact attributes, to one or more queues.

In general terms, the method enables a user to manage many forms of incoming communications in an automated fashion.

Figure 3B:
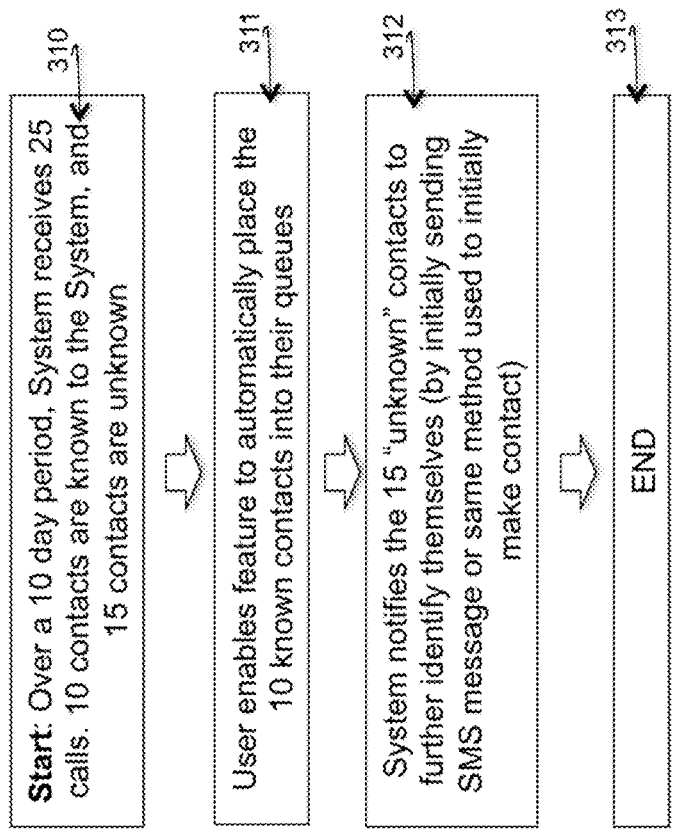
FIGS. 3a and 3b are block diagrams that illustrate examples of the automated handling of communication media.
Figure 3A:
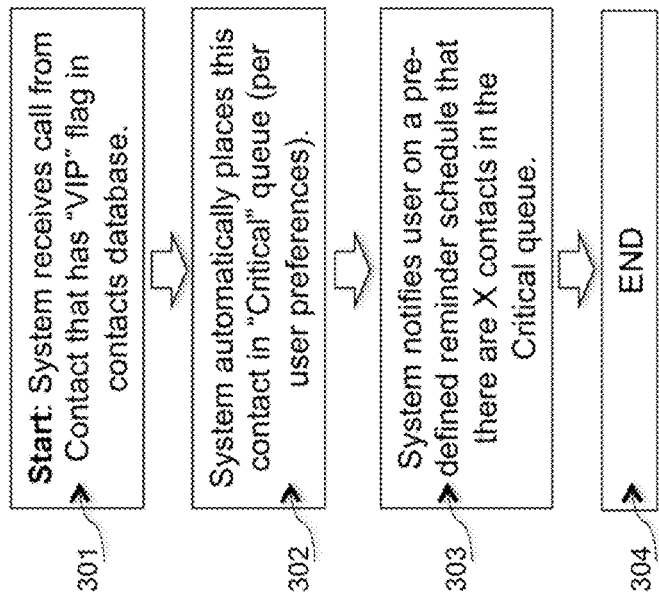

FIG. 3a illustrates a typical example. When a call or SMS is received [301] from an existing contact (ie. that is known to the system), the system will process or take action on the element as per the default settings, as per the contact's attributes, or as per user-defined preferences. In this example, the system places a call element from a contact that has previously been tagged "VIP" into the user's "Critical" queue [302]. The user will then receive notifications [303] (e.g. a SMS or system message) such as a reminder that there are a certain number of items in the critical queue.

FIG. 3b illustrates an example of handling new calls received [310] from contacts that are unknown to the user. The system gives the user the ability to set a preference that automatically directs [311] the call elements to the user's "hold" queue, or the system can automatically forward the element to another user (for example an admin or co-worker), or request the unknown contact to further identify themselves [312].

Representative examples of automatic queue assignment rules include: contact in the user's contact list; contact has been flagged by user as a VIP; contact has a high approval rating; contact was called by user x times in the past y days, etc.

Method for Sequential or Random Dialing of Contacts in a User-Defined or System-Defined Queue.

The intent of this method is to enhance the user's ability to efficiently communicate with a series of contacts in a given period of time. Specifically, the method enables the automatic, sequential, or random dialing of multiple contacts in a user-defined queue or default (system defined) queue.

Figure 4A:
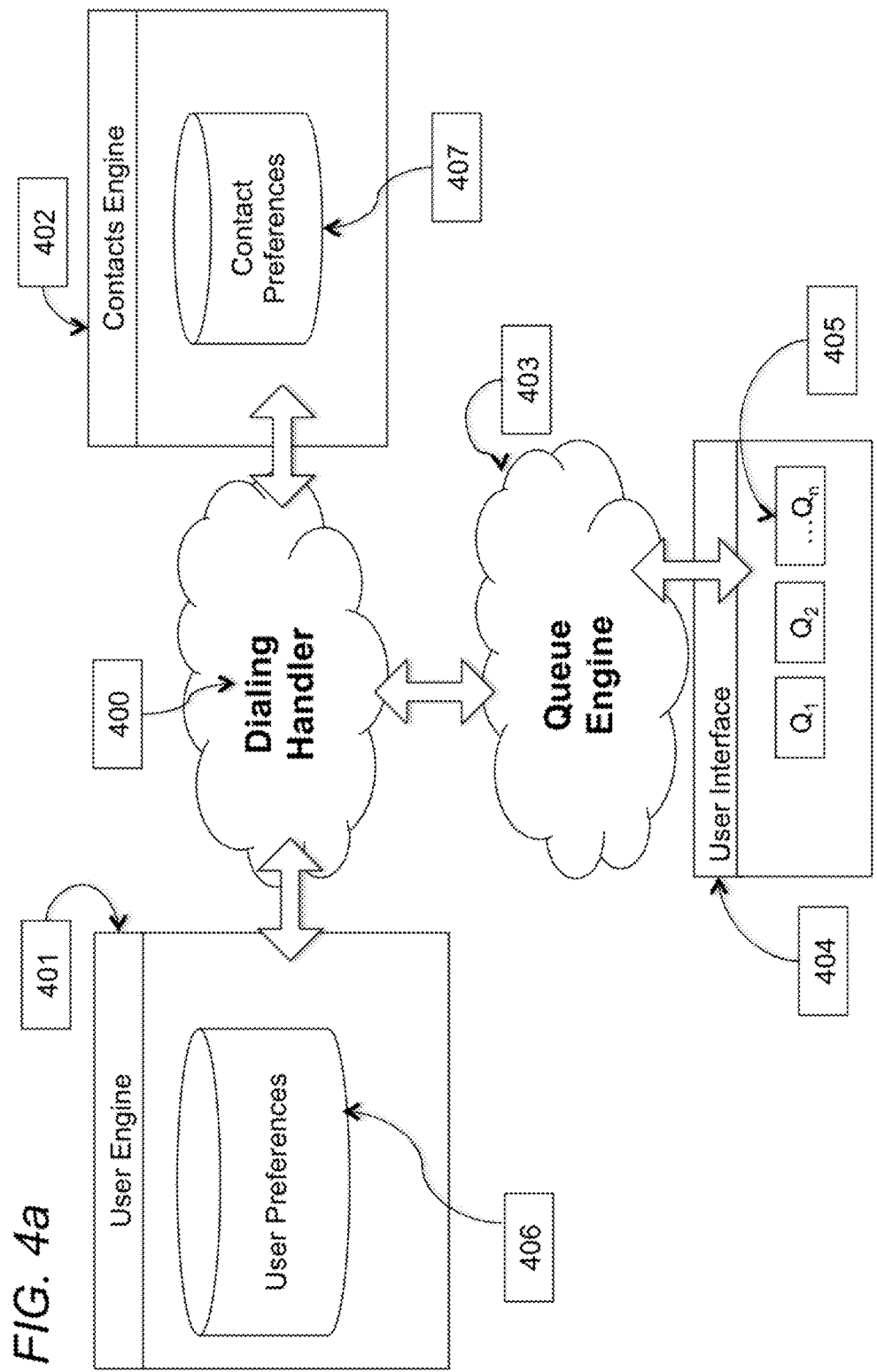
FIGS. 4a and 4b are a system diagram and block diagram that illustrate the Dialing process, respectively.

FIG. 4a illustrates a system view of this method, which involves a "Dialer Process" [400] that integrates with the User Engine [401], the Contacts Engine [402] and the Queue Engine [403]. The Dialer process uses standard telephony to establish telephonic connection between the User and each contact. When contacts are manipulated/placed in the User Interface [404] in user-defined or system-defined Queues [405], the User may choose to connect with each of multiple contacts in a sequential (e.g. alphabetic, visually apparent, numerical, et al.) or random manner. Again, all results rely directly on user preferences [406] and/or contacts preferences/characteristcs [407].

Figure 4B:
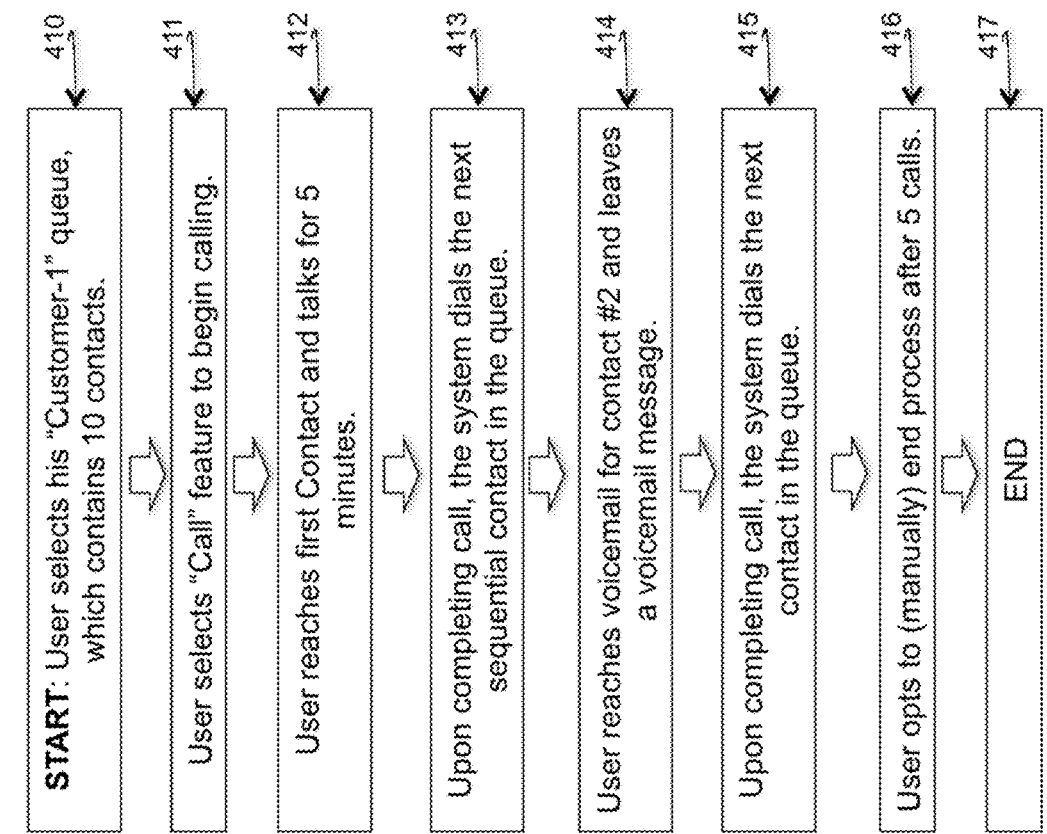

FIG. 4b illustrates an example workflow. In this example, a user has placed ten (10) contacts into a selected "Customer-1" queue [410]. The "placing" can be done manually, or by other system-driven means. When the user starts a dialing process [411], the system will begin the calling sequence. Specifically, the system will dial (using standard internet telephony [412], [413], [414], [415], etc.) through the contacts in the queue in the exact order that the user specified. Likewise, the user can start the call sequence at the beginning of the queue, or at any place in the queue.

This method gives the user the ability to choose to work through all calls, pause, resume, or exit. For example, the user may want to pause [416] part of the way through a calling sequence (ie. after contact #5 in the example of 10 contacts in the queue). The user can then resume calling, or choose to exit the queue. At this point, contacts that have not been called will remain in the queue.

A related feature in this method (not shown in the drawings) enables the user to randomly dial through the list of contacts in the queue. For example, user may choose her "Friday" queue, which contains seven (7) contacts. When the user selects "start queue", the system will randomly dial through all 7 contacts and then end. In one embodiment, this can be accomplished by the Dialer Engine using standard randomizer algorithm to set a sequence for the calling.

In another example, the user may want to quickly work through all calls in the incoming calls queue. In this example, the user has fifteen (15) calls in her incoming calls queue. The user can simply select "call queue" and the system will start calling those contacts in the order received, by name (alphabetically), or via some other system or user-defined rules.

As in the case of auto-dialing method, a rules/preferences engine is used to establish the type/mode of calling and includes both system (default) and/or user-defined rules.

Method for Improving Communications Efficacy by Enabling Workflow and Notifications Between Contacts.

The intent of this specific method is to solve the problem and waste associated with scheduling phone communications between two or more parties.

Figure 5A:
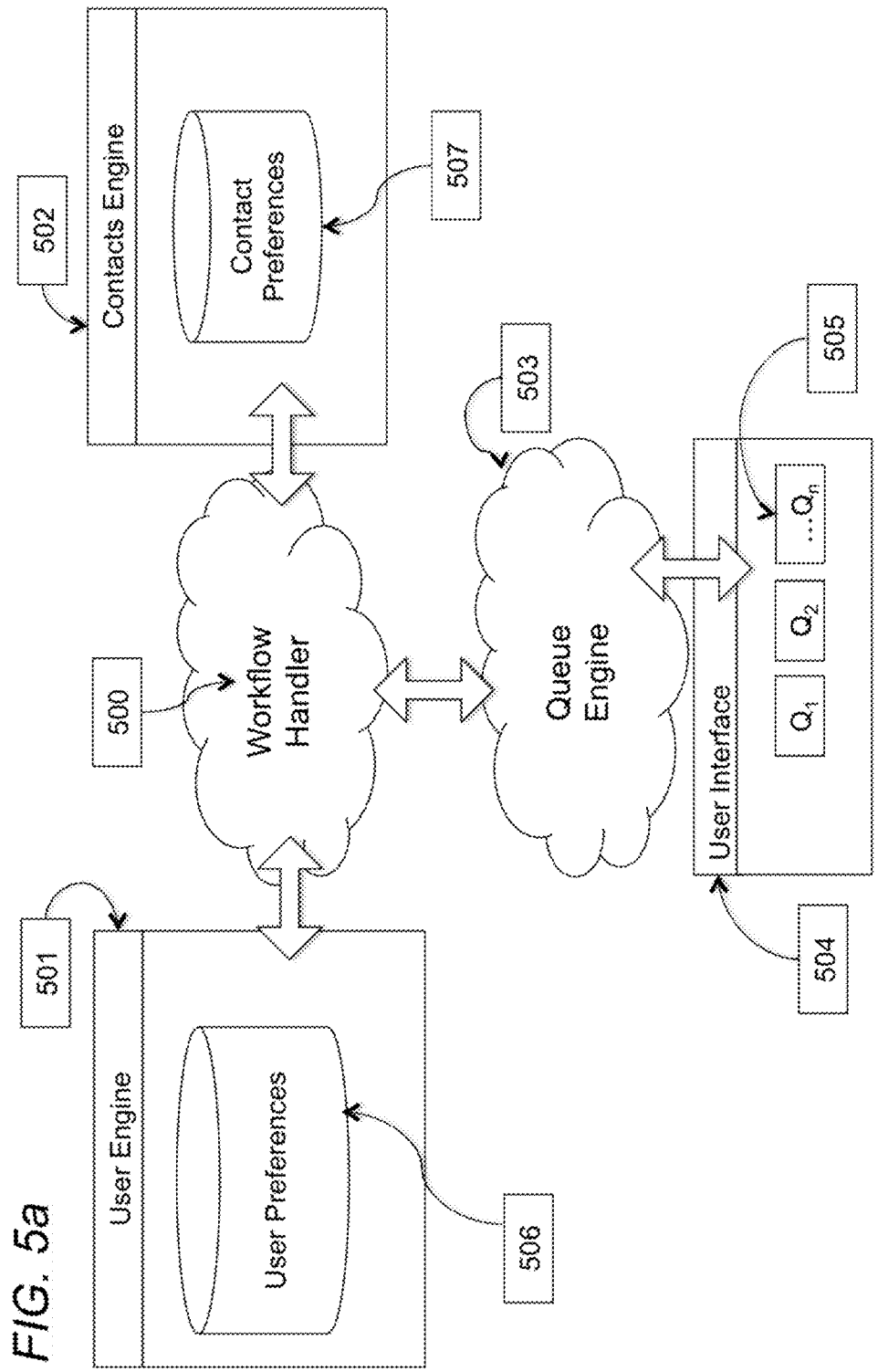
FIGS. 5a and 5b are a system diagram and block diagram that illustrate the Workflow process, respectively.

FIG. 5a illustrates the system view of this method, which involves a "Workflow Handler" [500] that integrates with the User Engine [501], the Contacts Engine [502] and the Queue Engine [503]. The Workflow Handler processes the status and state of Contacts in one or more queues that the User defines (recall from FIG. 1b the user may customize the names of these queues as "Work", "Personal", "VIP", etc.).

During a typical calling process, the workflow handler can be used to verify that contacts are available for an incoming call. If the User enables this preference, all contacts in a specific queue will receive a notification (via SMS, email, or other) that they can expect an incoming communication (e.g. phone call, email, SMS, et al) from the user.

Figure 5B:
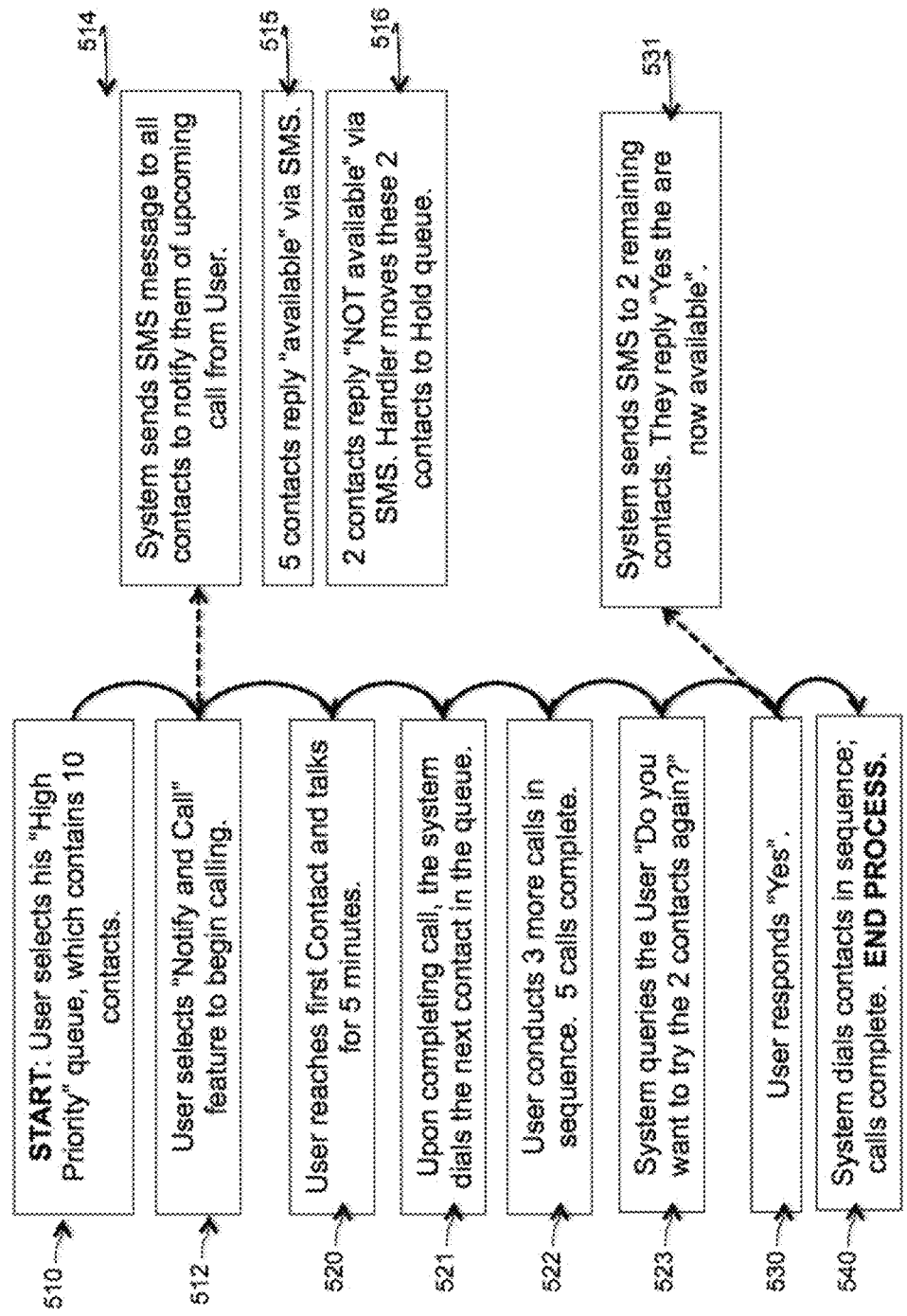

FIG. 5b illustrates a typical process flow. In this example, a user notices ten (10) contacts in his "High Priority" queue [510]. He decides to place calls to these contacts and will use the system's auto-dialing feature (ie. a process by which all calls will be contacted in the order in the queue). Before he starts the process, he wishes to notify each contact that he is starting the call sequence. He selects "Notify and Call" [512] whereupon the system sends an SMS or email (again based on user preference) to each contact in the queue to notify them [514]. The contacts, upon receiving the notification, can elect to (1) do nothing or (2) acknowledge the communication with a one of several possible responses. In one case, a contact in the Priority queue may simply signal that she acknowledges that the call is coming and is standing by [515]. In another example, a different contact may signal that they are not currently available to take a call [516]. In this case, the system will remove the contact from the active queue, or the system will "mute" the call (in other words the system will skip over this contact, but it will remain in the active queue). Both scenarios are dependent upon the preferences and settings that the user has specified in his user settings.

At each point in the process, and on a real-time basis, the queue in question is updated with the state and status of contacts based on their inputs/responses to data. For example, the queue that started with 10 contacts may end up with only 5 at [520] since the contacts have signaled "not available" when first contacted. In one embodiment, the 5 contacts that opted out may be moved to a "hold" queue, or back to their initial position. In other embodiments, the queues can be automatically prioritized by assigning relative weights to contacts of the same type. Again, all scenarios are dependent on User preferences.

Once the queue is updated based on these responses, the user can begin contacting calls in sequence [521], [522], or request that any missed contacts be tried again [523], [531].

Method for Improving Follow-Ups with Contacts.

The intent of this specific method is to improve the process associated with keeping in touch with, or following up with contacts (be they business, personal, or other).

Figure 6A:
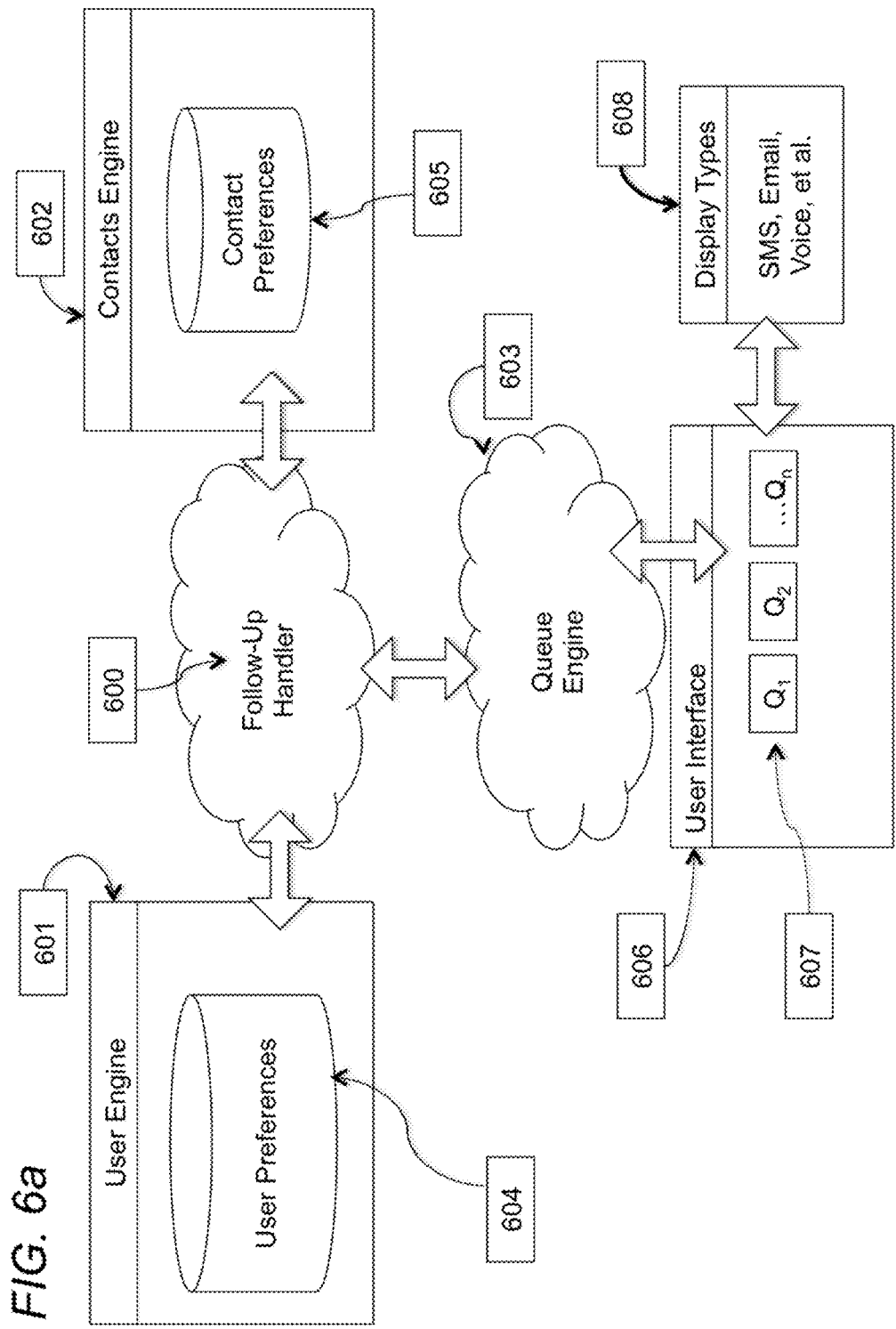
FIGS. 6a and 6b are a high-level system diagram and block diagram that illustrate the operation of the Follow-up Handler, respectively.

FIG. 6a illustrates a system view of this method, which involves a "Follow-up Handler" [600] that integrates with the User Engine [601], the Contacts Engine [602] and the Queue Engine [603].

The Followup-Handler processes User preferences [604] with the status and characteristics of Contacts [605] associated with the User, and the presence of those contacts in the User's queues [606]. When the User manually changes the status of a contact by moving it from one queue to another (as previously illustrated in FIG. 2b), or when the status of the contact moves to a queue by automated method, the Followup handler process runs and may take a variety of specific actions.

Specifically, the Follow-up Handler reacts to the User preferences for specific contacts, or for specific queues. For example, a user may specify that no contact in the user's "VIP-Client" queue should ever go "untended" for more than 5 days [note: as a matter of definition, the term "untended" implies that no call or SMS has been made to the contact in a certain timeframe (ie. has not been followed-up with)]. Further, the user may specify that any contact with aging over 5 days will automatically (1) be highlighted with a flag, (2) placed in the user's Incoming queue, and (3) SMS and/or email reminder notifications are sent reminding the user to take action on these contacts. In another example, the user can specify that all contacts with "customer" flag (set by the user) should receive a call on the last Friday of each month at 11 am EST. In this case, when this specific anniversary arrives, contacts meeting this profile (ie. flagged as customers) will be added to the specified queue for calling or other communication.

Figure 6B:
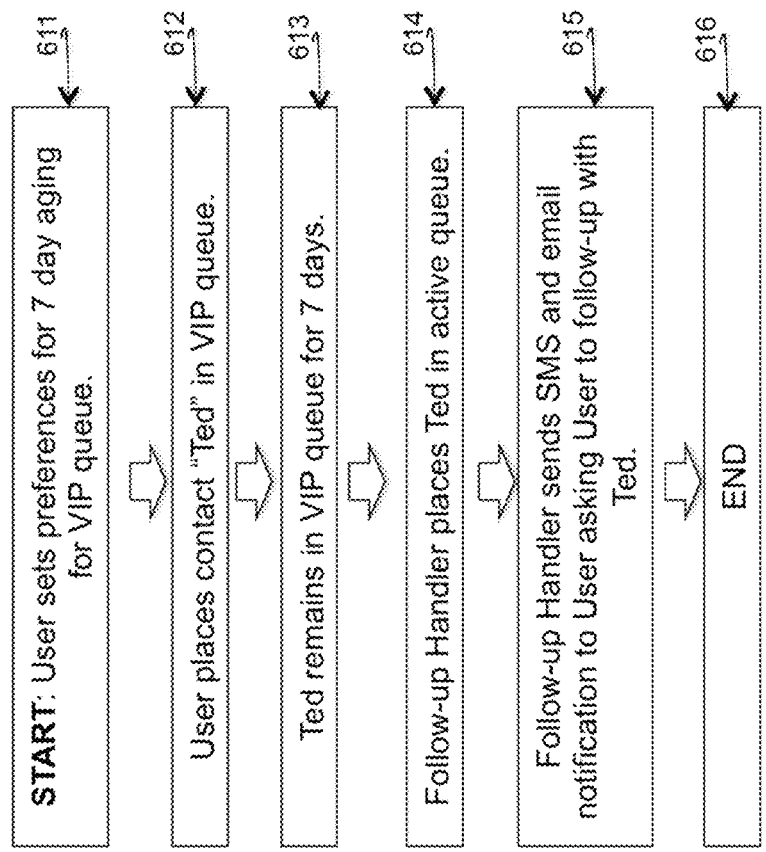

FIG. 6b is a process flow that illustrates aspects of the example above.

Here, the user has set a seven-day aging limit for the VIP queue [611]. A contact from "Ted" is placed in a VIP queue [612] and remains unattended to for 7 days [613]. The Follow-up Handler places the Ted contact in the active queue [614] so that contact is initiated [615].

Method for Presenting Commerce-Based Recommendations or Other Customized Recommendations to a User Based on that User's Specific Communications.

This method enables recommendations to a user based on user's communications activity. In one embodiment, the recommendations may be commerce based. In another embodiment, the recommendations may be related to other content such as, but not limited to, news or events or travel/map related information.

Figure 7:
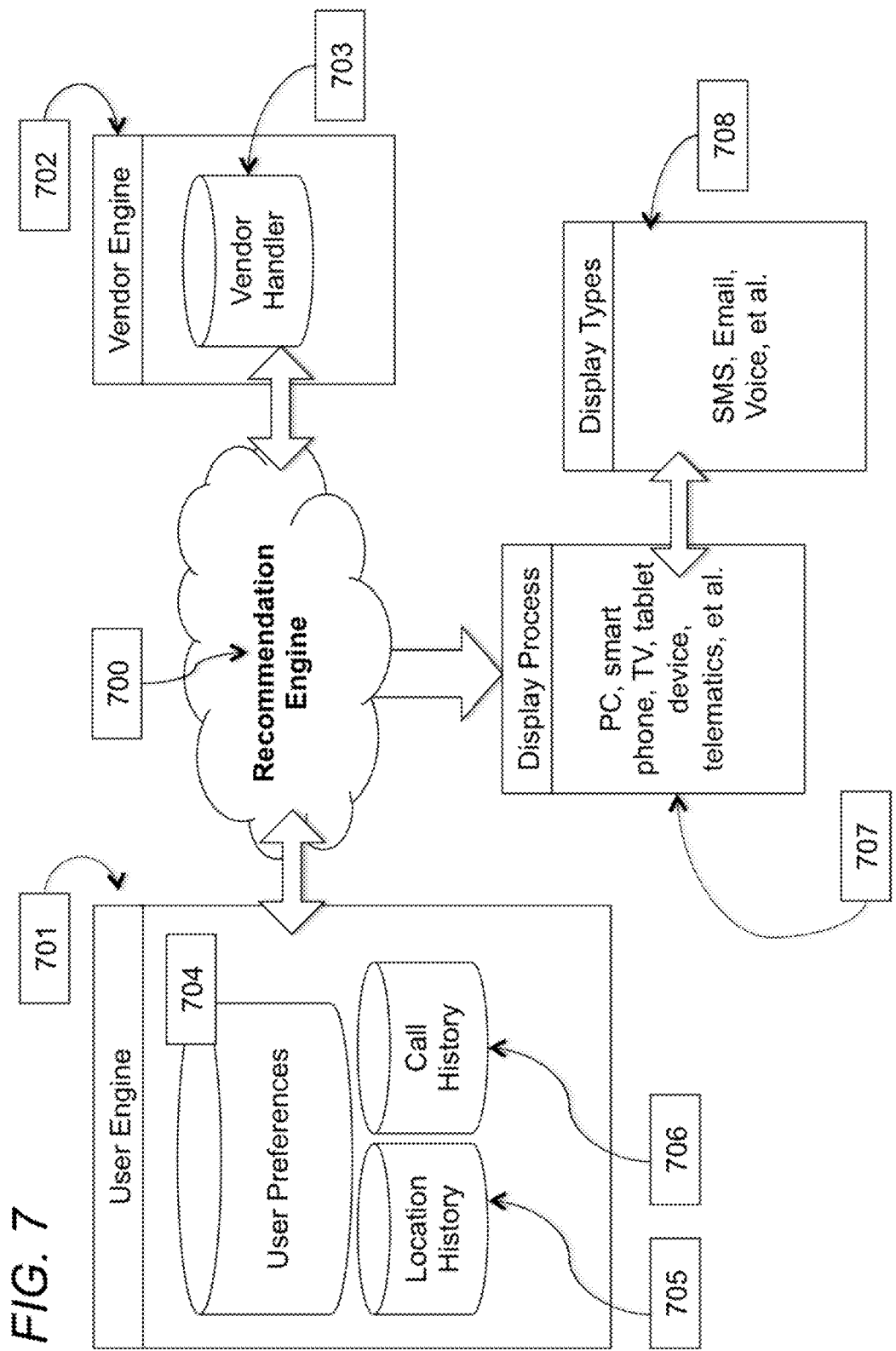
FIG. 7 is a high-level system diagram that illustrates the key components of the Recommendation method.

FIG. 7 illustrates this specific method is a recommendation engine ("engine") [700] that interfaces with a user engine [701] and a vendor engine [702] to display customized results to the user. The recommendation engine utilizes key user preference data, which may include specific attributes from the user's communications history [703] or location history [704] (or combination thereof). In one embodiment, the engine may process the user's call history as a source, in another embodiment the engine may process the user's SMS (text) history as a source. In still another embodiment, the engine may process the user's native GPS information as a source. In yet another embodiment, the engine may use any combination of the aforementioned sources (eg. call history, GPS information, and SMS history).

The content resulting suggestions may be presented by the system in a number of ways, including but not limited to email, text, or voice [706]. The resulting suggestions may be read or processed by the user in a number of ways [706] including but not limited to PC, smart phone, tablet, interactive television, vehicle-based information system, et al.

Representative example: In a specific time period (say 5 days) a user has made 10 calls to the 619 area code (San Diego area) and has also received 13 SMS texts from contacts in that same area code. The system stores and analyzes this data and the suggestion engine processes this data and makes recommendations to the user. One such recommendation could be restaurants or hotels in the San Diego area that are having upcoming specials or deals. Another suggestion could be related to travel plans (air, hotel, car rental etc) or to events like upcoming concerts in the San Diego area, or tickets to the San Diego zoo.

In another example, a user places a call to a friend in New York City. The system recognizes that the user is driving (based on GPS info) and makes a suggestion based on these elements. One suggestion may be "I see you are driving; do you need a map to this location that you are calling?" Another suggestion may be "You may want to take an alternate route; looks like traffic is heavy ahead." Again, these suggestions may be presented to the user in a number of ways, including email, SMS, voice command, etc.

Method for Signaling "Open/Available" Status to Contacts and Subsequent Handling of Communication.

The intent of this specific method is to solve the problem and waste associated with communicating with contacts. This method is somewhat analogous to "office hours" where people (mostly in business or academia) establish set hours that their door is open for employees to come by and talk. The difference here is that the system is leveraging the communications technology.

FIG. 8 illustrates how the specific method is accomplished, via a Status Handler [800] that processes user preferences [801] and contact preferences [802] to display results. Specifically, if the "open" feature is enabled, the status handler notifies specific contacts or social media applications per the User preferences and then waits for a call or communication.

Similarly, if the feature is disabled, the handler notifies specific contacts or social media applications.

Figure 8C:
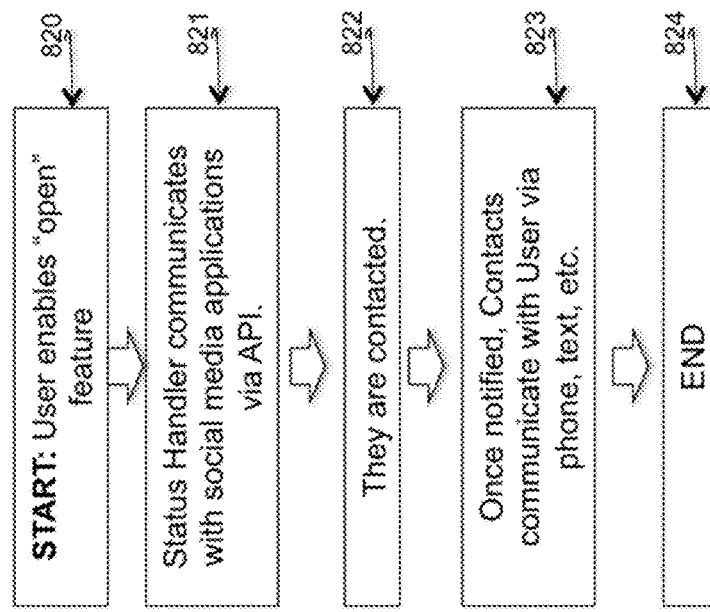
Figure 8B:
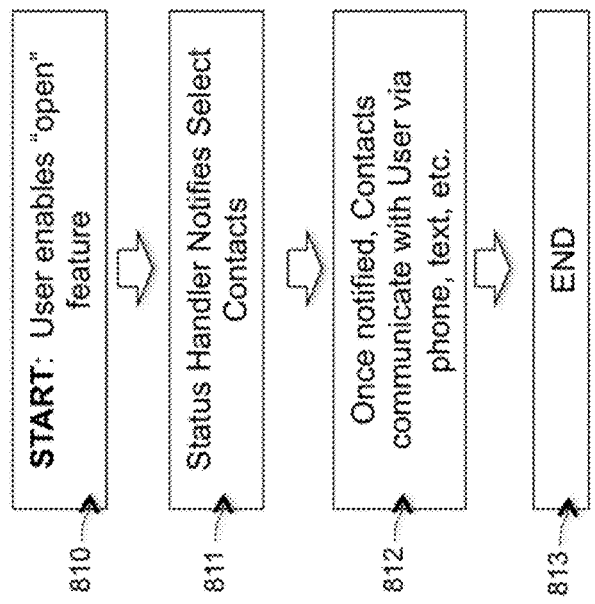

See FIGS. 8b and 8c for an exemplary high-level system diagram and process flows.

Representative examples: In one scenario, the User knows that he will be driving for 5 hours from city A to city B. He wishes to signal to certain contacts that he is open and available to take incoming calls [810]. On his mobile device, he enables this feature, placing himself in "open" status. At this point, the status handler notifies [811] certain contacts that may get a SMS or email notification that the User is open for calls. Once notified, those people initiate contact [812].

In another related scenario, the User may broadcast his Open status via common social media tools such as Twitter, Facebook, Linkedin, et al. See FIG. 8b steps [821], [822], [823].

Method to Reduce Distracted Driving via Game-Based or Incentive Systems.

The intent of this specific method is to reduce distracted driving by implementing a game or incentive system.

The specific method is accomplished by a "Game Process" that takes into account the users's location (and other preferences) and tracks the number of incoming and outgoing communications while the mode is enabled.

Representative example: A traveler is driving from Pittsburgh to Washington, DC (about 275 miles and a 5 hour drive). At the beginning of the trip, the driver sets her phone in "safe driving" mode. At this point, the system calculates the time and geo location of the driver. During the drive to DC, the driver receives 6 incoming calls. Since the system is in "safe driving" mode, the driver does not receive phone calls. Instead, the application is processing total miles, calls "avoided", and other usage data to arrive at a total score. In one embodiment, a score may be:

$$\text{User Score} = D \times MC \times PF$$

Where D=total distance driven/travelled; MC=total number of missed/avoided calls while driving, and PF=is a penalty factor (represented by a percentage) that reduces the score for instances of using the phone while driving (e.g. using SMS or making/receiving calls).

In the example above, the traveler would receive a score of 275×6×1=1,650. This score can then be shared/broadcasted via typical social media sites such as Twitter, Facebook, et al. Over time, users can redeem their safe driving points at participating retail outlets. Ultimately, the combination of gaming, points, and vendor participation may incentivize more drivers to focus more on driving and less on the smart phone.

In one embodiment, the system may require "check ins" at points along the way to prevent user's gaming the system. The system would synthesize the distance/time and GPS information provided by the mobile device with the user's check-ins to calculate the user's true travel activity.

It should be understood that the example embodiments described above may be implemented in many different ways. In some instances, the various data processors, engines, servers, and the like described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof. The computers that execute the processes described above also may be deployed in a cloud computing arrangement that makes available one or more physical and/or virtual data processing machines via a convenient, on-demand network access model to a shared pool of configurable computing resources (e.g., networks, servers, storage, applications, and services).

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the system block and process flow diagrams may include more or fewer elements, be arranged differently, or be represented differently. But it further should be understood that certain implementations may dictate the diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for manipulating graphical user interface (GUI) objects that represent communication media messages, the GUI objects displayed on a display of a data processing system, the method comprising:
    a) receiving messages from multiple message originators via two or more message services including a telephone message service and including at least one of a short message service (SMS) and an electronic mail (e-mail) message service, the messages including an originator identifier (ID);
    b) generating a plurality of call elements, with each call element representing a particular message and sender profile information associated with the originator ID for the particular message;
    c) generating a visual element for each of the call elements;
    d) displaying a plurality of available queues on the display, the display of each available queue including one or more of the visual elements in each queue as a GUI object; and
    e) in response to an input received via a user interface, moving a selected one of the visual elements to a new queue;
    f) via the user interface, accepting an input indicating that a selected queue is to be processed in a defined sequence; and
    g) processing the selected queue by initiating return communications for the call elements in the defined sequence.

2. The method of claim 1 wherein the display screen is a touch sensitive screen, and the input indicating movement of the selected visual element to a new queue is provided by a finger gesture.

3. The method of claim 2 additionally comprising moving the GUI object corresponding to the selected visual element on the display to the new queue indicated by the input.

4. The method of claim 1 additionally comprising, subsequent to accepting input indicating that the selected one of the visual elements is to be moved to a new queue, updating the sender profile information associated with the originator ID based on the new queue into which the visual element is to be moved.

5. The method of claim 4 additionally comprising, subsequent to accepting input that more than one visual element associated with more than one message having a same originator ID is to be moved to the new queue, automatically moving subsequently received messages with the same originator ID to the new queue.

6. The method of claim 1 wherein the sender profile information includes one or more of a telephone number, a name, a very important person (VIP) identifier, a label, an approval identifier, or a past contact frequency associated with the originator.

7. A method for processing queue entries that represent communication media messages, the queue entries stored in multiple queues managed by a data processing system, the method comprising:
    a) receiving messages from multiple message originators via two or more message services including a telephone message service and at least one of a short message service (SMS) and an electronic mail (e-mail) message service, the messages including an originator identifier (ID);
    b) generating a plurality of queue entries from the messages, with each queue entry representing a particular message and sender profile information associated with the originator ID for the particular message;
    c) displaying a visual representation of several available queues on a display, the display of each available queue including one or more of the queue entries; and d) in response to receiving user input, moving at least one queue entry to new one of the available queues;
e) accepting user input indicating that a selected one of the queues is to be processed in a defined sequence; and
f) processing the selected queue by initiating return messages for each of the queue entries in the selected queue in the defined sequence.

8. The method of claim 7:
wherein the defined sequence for the return messages is an order resulting from receiving user input moving queue entries.

9. The method of claim 8 wherein the defined sequence for the return messages selects a queue entry for the return message randomly from the selected queue.

10. The method of claim 8 wherein the defined sequence for the return message is based on comparing one or more of a name, a very important person (VIP) identifier, a label, an approval identifier, or a past contact frequency associated with the originator ID.

11. The method of claim 7 additionally comprising:
prior to initiating the return messages, sending an initial notification message to the originator associated with each queue entry to indicate that a corresponding return message is to be expected.

12. The method of claim 11 additionally comprising, subsequent to sending the initial notification message,
receiving an acknowledgment of the initial notification message from the originator associated with each queue entry; and
subsequent to receiving the acknowledgement, only then initiating the return message.

13. The method of claim 11 wherein if an acknowledgement of the initial notification is not received from the originator within a predetermined time, then moving the selected message to a different queue having a lower priority.

14. The method of claim 7 additionally comprising:
sending an availability message to the originator to indicate that a user is available to receive a telephone call.

15. The method of claim 14 wherein the availability message further indicates an available time to receive the telephone call.

16. The method of claim 7 wherein steps a) through d) are performed on a first data processing device, and steps e) and f) are performed on a second data processing device.

17. The method of claim 16 wherein a server which is a third data processing device stores the queues.

* * * * *